United States Patent
Au et al.

(10) Patent No.: US 7,882,101 B2
(45) Date of Patent: *Feb. 1, 2011

(54) OPTIMIZING SEARCH TREES BY INCREASING SUCCESS SIZE PARAMETER

(75) Inventors: Grace Au, Rancho Palos Verdes, CA (US); Bhashyam Ramesh, Secunderabad (IN); Haiyan Chen, Yorktown Heights, NY (US)

(73) Assignee: Teradata US, Inc., Dayton, OH (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/535,632

(22) Filed: Sep. 27, 2006

(65) Prior Publication Data
US 2007/0073647 A1   Mar. 29, 2007

(51) Int. Cl.
*G06F 7/00* (2006.01)
*G06F 17/30* (2006.01)

(52) U.S. Cl. .................................................. 707/714
(58) Field of Classification Search .............. 707/1–4, 707/100
See application file for complete search history.

(56) References Cited

U.S. PATENT DOCUMENTS 5,848,408 A * 12/1998 Jakobsson et al. ............ 707/3
5,963,932 A    10/1999 Jakobsson et al.

* cited by examiner

*Primary Examiner*—Uyen T. Le
(74) *Attorney, Agent, or Firm*—John Cowart, Senior Attorney (57) ABSTRACT

A SQL query that includes an IN-List is optimized by (1) performing an evaluation to determine whether access to a table can be performed as a join operation, (2) converting the IN-List to an IN-LIST relation, and (3) joining the IN-List relation with the table to access the data in the table.

37 Claims, 4 Drawing Sheets

OPTIMIZING SEARCH TREES BY INCREASING SUCCESS SIZE PARAMETER

BACKGROUND

Relational database systems store data in tables organized by columns and rows. The tables are typically linked together by "relationships" that simplify the storage of data and make complex queries against the database more efficient. Structured Query Language (or SQL) is a standardized language for creating and operating on relational databases.

A relational database system typically includes an "optimizer" that plans the execution of SQL queries. For example, if a query requires access to a table, the optimizer will select an "access path" which either produces the requested results in the shortest period of time or satisfies some other criteria.

In some cases, tables in a relational database system may contain a very large amount of data. For example, many large retail chains may operate relational databases that contain daily sales figures. The tables of daily sales figures may include millions or billions of rows and a large number of columns. A better access path is important in such cases because scanning all rows and/or columns in a is large table is time consuming and may impose an unacceptable load on computing resources.

Typically, a database administrator defines an "index" that contains one or more frequently accessed columns on a table. An index is a smaller table which references columns in another table. Accessing a table through an index can avoid the need to perform an all-row scan on the table. However, to use an index for a single table access, an index key that contains one constant value per index column needs to be specified in the query. Otherwise, the optimizer cannot use the index to access the table and will revert to using an all-row scan operator.

SUMMARY

An optimization technique is provided that avoids the need to scan an entire table to locate and access relevant data. This is accomplished, for example, by recognizing when an IN-List query can be processed as a join operation, or a series of join operations, which can thereby utilize an index or an advantage join method, rather than a scan operation. The method of using a join operation to accomplish single table retrieval is referred to as the "In-List access path".

In general, in one aspect, the invention features a method for optimizing access to a database, where the SQL query includes an IN-List which requires the scanning of a table or a series. The method includes evaluating whether access to the table can be performed as a join operation. If it can, the method includes the step of transforming the IN-List into a relation, and joining the IN-List relation with the table.

Implementations of the invention may include one or more of the following. The method may further include transforming the IN-List to a spool. The method may further include evaluating the cost of a plurality of different IN-List access paths. Evaluating the cost of the IN-List access path may include using the optimizer's join planner to evaluate the cost of a plurality of different join paths to implement the join between an IN-List relation and the table. The method may further include selecting the least costly of a plurality of different access paths. The method may also include evaluating whether an index is usable for the join between the IN-List and the table and if so, joining the IN-List relation with the table through the index. The method may also include recognizing single column IN-Lists and/or multiple column IN-Lists. The index may be a primary index of the table, or a secondary index of the table that can be used as either a covering index or a non-covering index to provide access to the table.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities; and an optimizer for optimizing a plan for executing a query including an IN-List. The optimizer includes a process for evaluating whether access to the table is capable of being executed as a join operation. If it can, the IN-List is transformed into a relation, and the IN-List relation is joined with the table.

In general, in another aspect, the invention features a computer program, stored on a tangible storage medium, for use in optimizing access to a database by converting suitable IN-List queries from a scan operation to a join operation. The program including executable instructions that cause a computer to evaluate whether access to the table is capable of being performed as a join operation. If it can, the process transforms the IN-List into a relation, and joins the IN-List relation with the table.

Other features and advantages will become apparent from the description and claims that follow.

DETAILED DESCRIPTION

Figure 1:
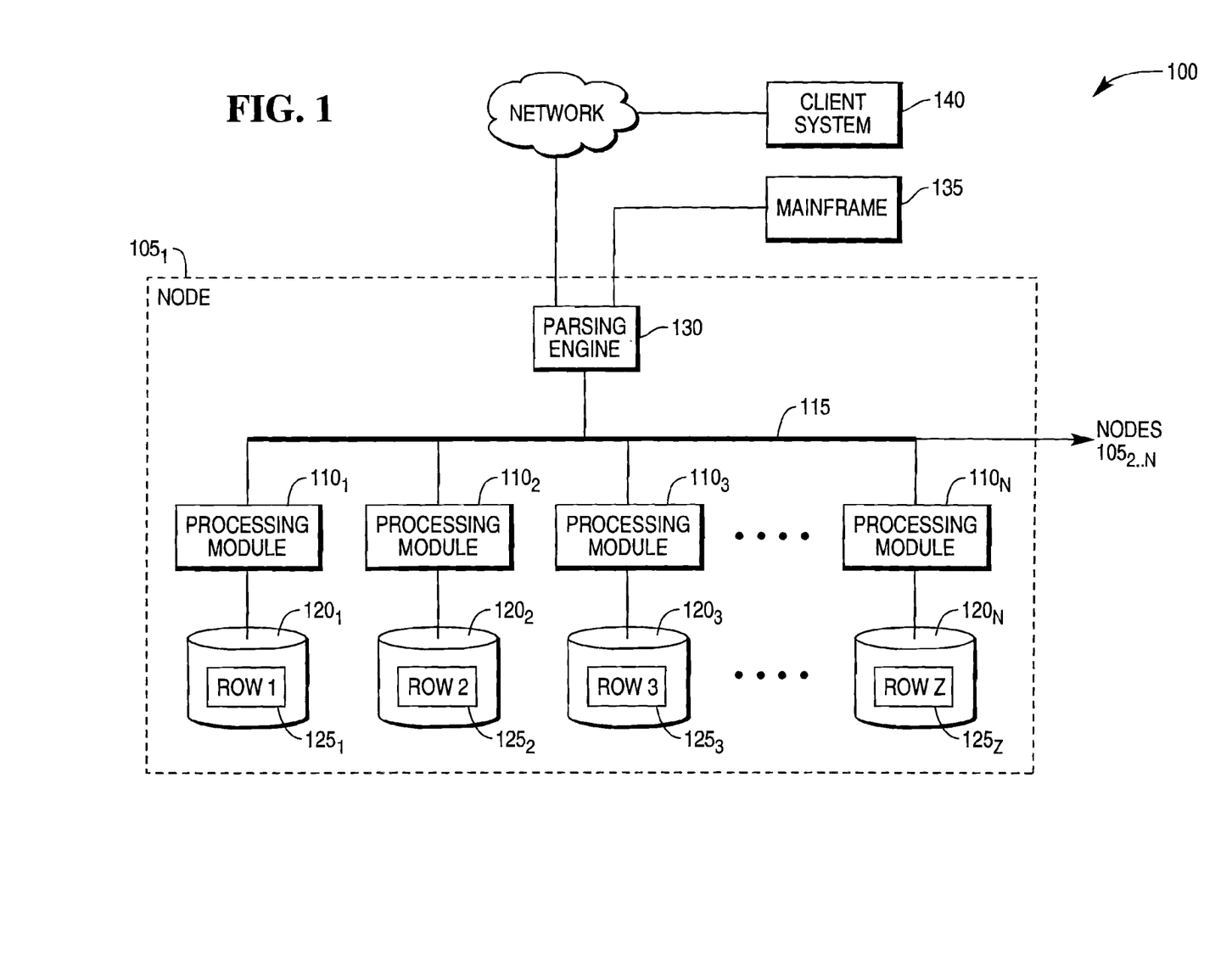
FIG. 1 is a block diagram of a node of a database system.

The query optimization technique disclosed herein has particular application to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115 that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on each physical processor. If there are 8 virtual processors and 4 physical processors, the operating system would distribute the 8 virtual processors across the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries in a standard format, such as SQL.

Figure 2:
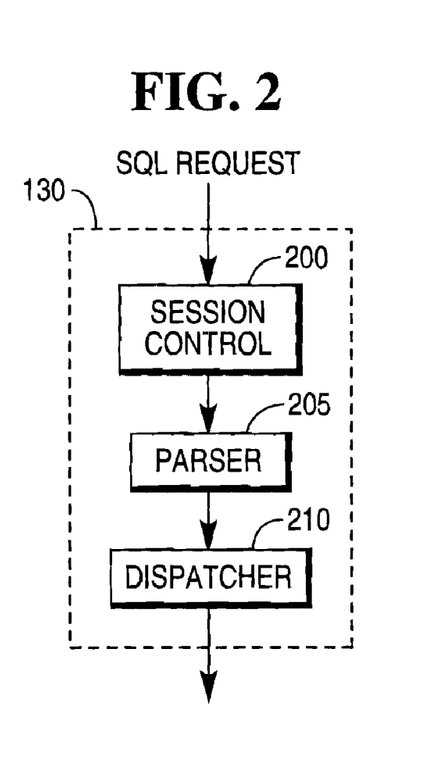
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
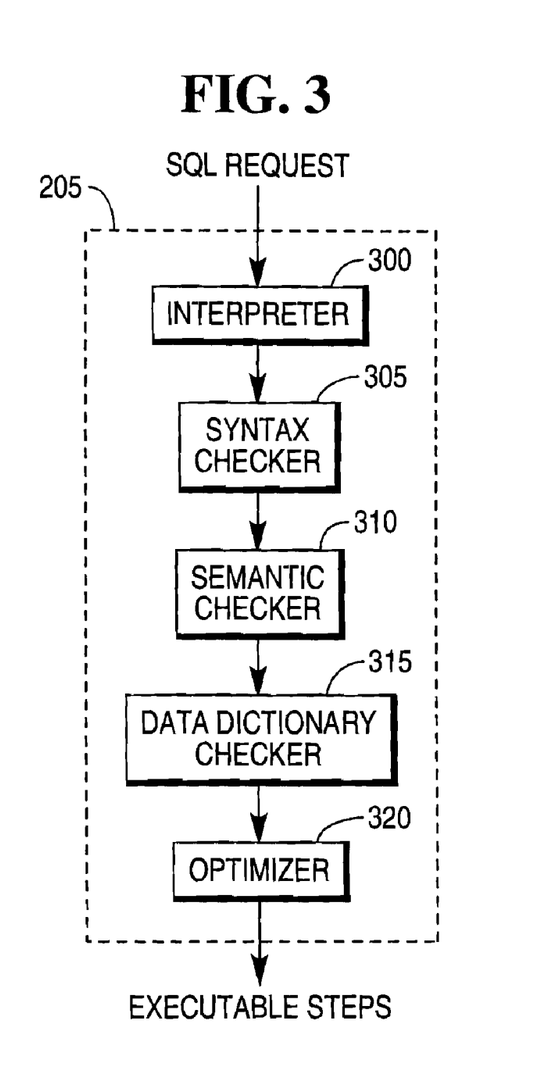
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks the request for correct SQL syntax (block 305), evaluates the request semantically (block 310), and consults a data dictionary to ensure that all of the objects specified in the SQL request exist and that the user has the authority to perform the request (block 315). Finally, the parser 205 runs an optimizer (block 320) that selects the least expensive plan to perform the request.

An important element of the Teradata Active Data Warehousing System available from NCR Corporation is the "primary index" column that the database system's user assigns for each table. The database system hashes the rows of each table, using the primary index column as the basis for the hash, and distributes the rows among the data storage facilities $120_{1...N}$ based on the hash results. If the primary index column is correctly selected, the "distribution" technique evenly distributes the rows of each table across all of the data storage facilities $120_{1...N}$ in the system. This is true if the chosen primary index column has unique values, producing a unique primary index (UPI), but is not always true if the chosen primary index column has non-unique values, producing a non-unique primary index (NUPI). The same hashing technique is used to retrieve rows of data from a table, as the primary index provides a path to the rows of a table.

The Teradata Active Data Warehousing System also provides a secondary index capability, which provides an alternative path to the rows of a table. A table can have more than one secondary index. Unlike a primary index, a secondary index does not affect the distribution of table rows among data storage facilities $120_{1...N}$.

An alternative way to access a table which is supported by the Teradata Active Data Warehousing System is to use a join index that contains one or more frequently accessed columns from one or more tables. The optimizer may choose to either access columns from the join index or access columns from the base table (or tables) from which the data in the join index is selected. Consequently, a join index allows the optimizer to rewrite a query to retrieve from a join index instead of from a base table. The join index has a primary index which can be different from the primary index of the base tables. The join index can also have one or more secondary indexes.

Figure 4:
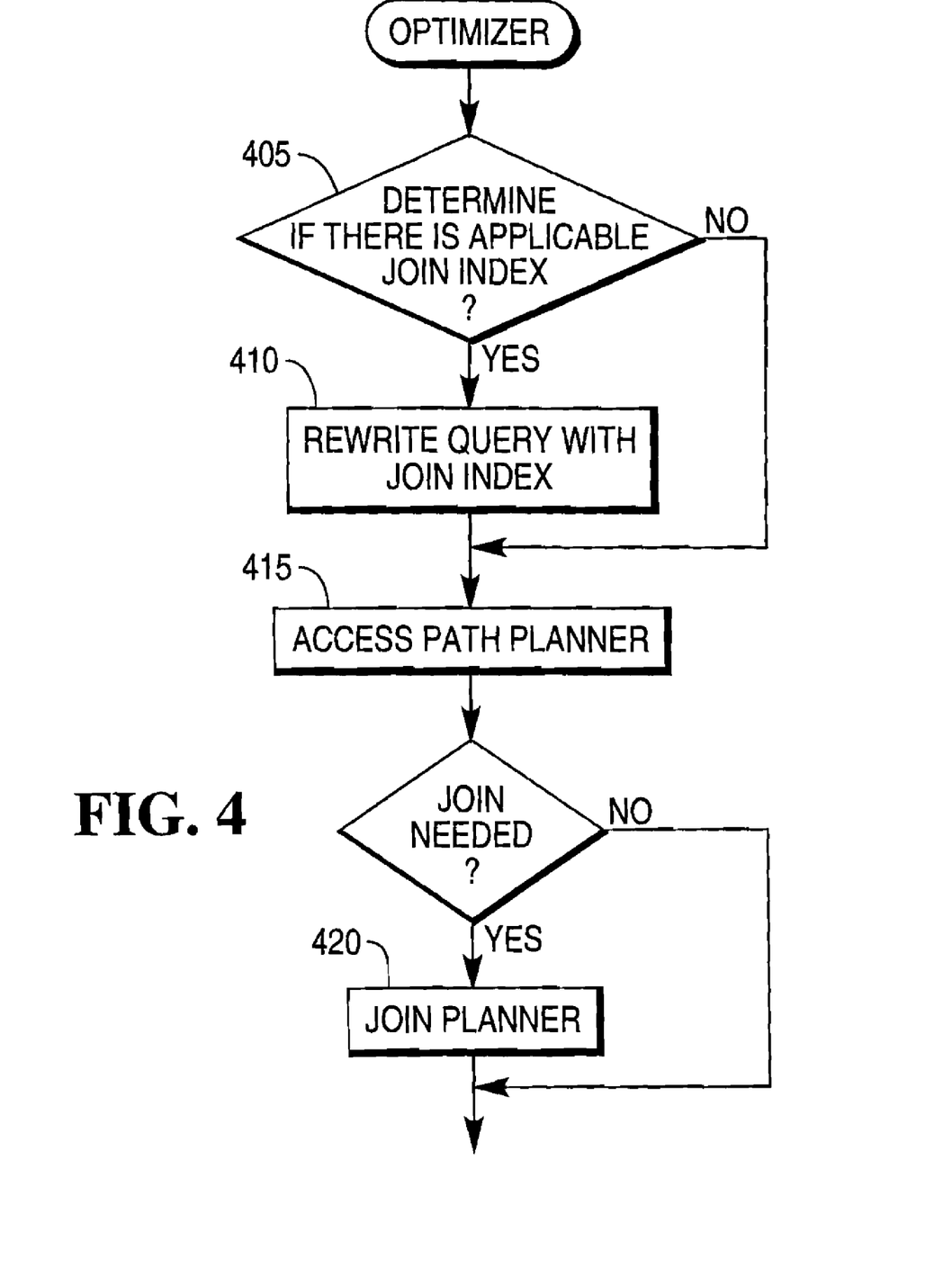
FIG. 4 is a flow chart of an optimizer.

When a query arrives, the optimizer first determines if there is an applicable join index (block 405), as shown in FIG. 4. If an applicable join index can be used to substitute the base table or partially substitute the table, the query is rewritten using the join index (block 410). The optimizer invokes the access path planner for the rewritten query with the join index (block 415). If a join is needed, the optimizer also invokes the join planner (block 420). For the original query, the access path planner and/or join planner are also invoked as applicable.

The optimizer includes an extended access path planner (block 415) to support a new access path using an IN-List to access the table through an index by converting a single table access to one or more joins.

Figure 5:
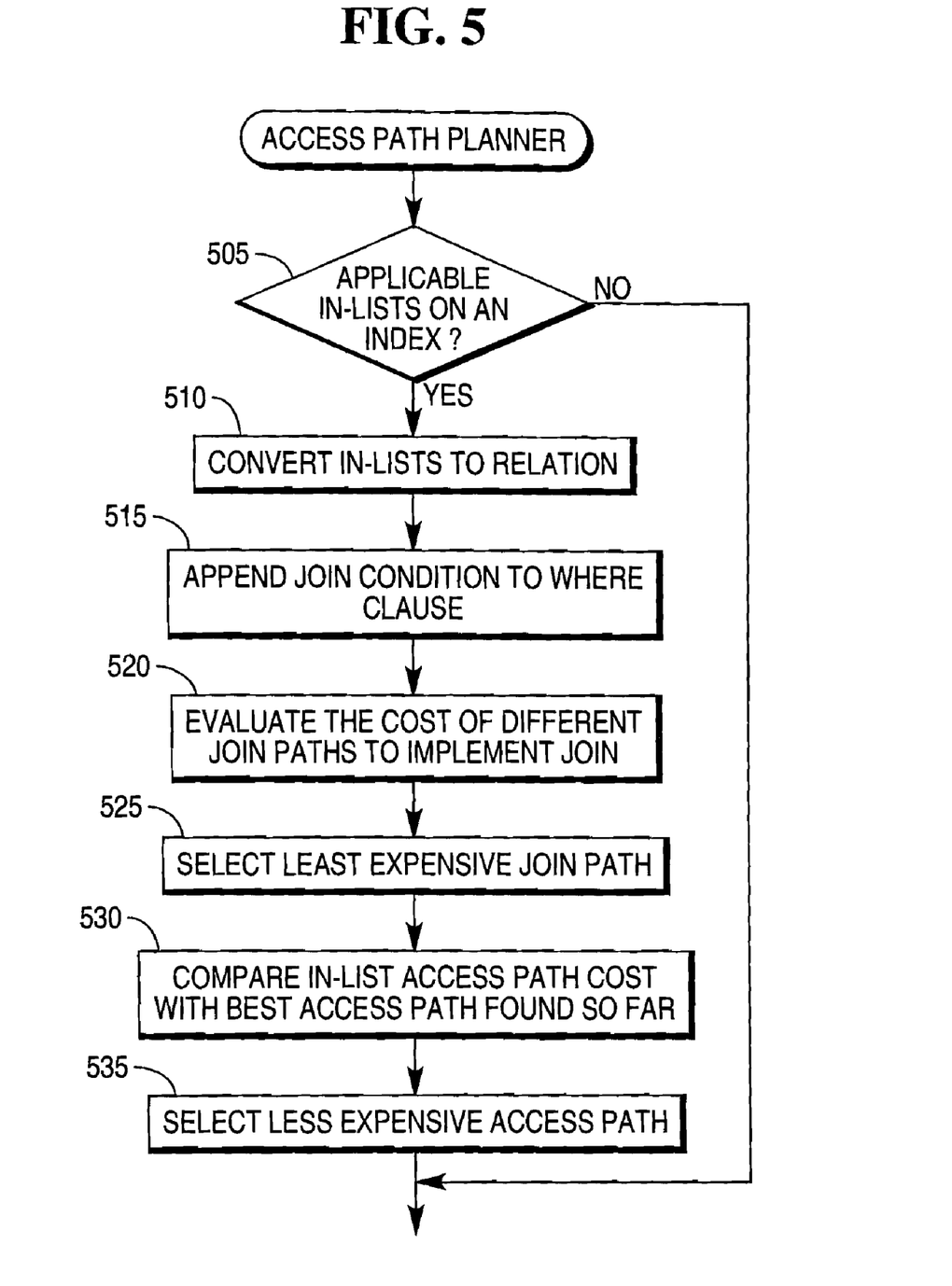
FIG. 5 is a flow chart of a technique for optimizing the access path to a table.

As illustrated in FIG. 5, for each index defined on the table, the optimizer first recognizes an IN-List that is suitable for the application of the IN-List access path (block 505). Two forms of IN-List are recognized. The first type of IN-List recognized is a single column IN-List specified in SQL using either an IN predicate as shown in the example below:

daily_sales_tbl.day_dt in ('1999-01-01', '2001-01-01', '1997-12-01')

or an OR'ed condition as shown below:

daily_sales_tbl.day_dt='1999-01-01' OR daily_sales_tbl.day_dt='2001-01-01' OR daily_sales_tbl.day_dt='1997-12-01'

The second type of IN-List recognized is a Multi-column IN-List that is specified in SQL using a list of OR'ed compound conditions on the same set of columns, as shown in the example below:

(daily_sales_tbl.day_dt='1999-01-01' AND daily_sales_tbl.sku$_{id}$=12345002) OR (daily_sales_tbl.day_dt='2001-01-01' AND daily_sales_tbl.sku_id=12345001) OR (daily_sales_tbl.day_dt='1997-12-01' AND daily_sales_tbl.sku id=12345000)

The IN-List for one specific index can be a combination of one or more single-column IN-Lists and/or one or more multi-column IN-Lists. All the columns of an index require an IN-List binding in the query.

If an index has all columns specified in the IN-List, the single-table access path planner first converts the IN-List to a relation (bock 510). Join conditions between the table and IN-List relation are then added to the WHERE clause (block 515). The binary join planner is then invoked to choose the most cost-effective join between the IN-List relation and the large table (block 520). The cost of the IN-List access path technique is equal to the cost of the best join chosen (block 525). By comparing with the cost of conventional access paths, an In-List access path is chosen if it has the lowest cost of all access paths available (block 530). In the case of multiple indices for which an In-List access path is applicable, the least expensive In-List access path is chosen.

An example IN-List query available for a single column secondary index (day_dt) on table daily_sales_tbl is shown below:

```
sel sum(sell_amt) from daily_sales_tbl
where daily_sales_tbl.day_dt in
    ('2002-12-31', '2003-01-01', '2003-05-23',
    '2003-05-24', '2003-05-25', '2003-05-26',
    '2003-07-04', '2003-07-05', '2003-07-06',
    '2003-08-30', '2003-08-31', '2003-09-01',
    '2003-11-21', '2003-11-22', '2003-11-23',
    '2003-12-24', '2003-12-25', '2003-12-26',
    '2003-12-27', '2003-12-28');
```

This query can be converted into a join by converting the IN-List into a relation, which in the present example, is achieved by inserting the IN-List values into a spool which has one row containing the field 'day_dt'. This is achieved by using the following join condition:

JR1.day_dt=daily_sales_tbl.day_dt

Since the join condition has a complete binding on the secondary index (day_dt), the IN-List spool can be joined to table daily_sales_tbl through the secondary index. This produces a table of data which is equivalent to the result that would be produced if the entire table were scanned.

In the case where there is more than one IN-List, the IN-Lists are combined before performing a join operation to the table. The combination can be performed in a parser by merging the IN-List into a single ORed condition. The combination may also be performed on each unit of a Massively Parallel Processing (MPP) computing system by using a Cartesian product join. For example, see related US patent application entitled "Optimizing the Insertion of Rows in a Table", filed by NCR Corporation and incorporated herein by reference. An example is given below, which includes a table daily_sales_tbl which has a primary index (locn_nbr, day_dt) and the following In-List query:

```
sel sum(sell_amt) from daily_sales_tbl
where daily_sales_tbl.locn_nbr in (4597, 4946, 4618, 4825) and
    daily_sales_tbl.day_dt in
        ('2002-12-31', '2003-01-01', '2003-05-23',
        '2003-05-24', '2003-05-25', '2003-05-26',
        '2003-07-04', '2003-07-05', '2003-07-06',
        '2003-08-30', '2003-08-31', '2003-09-01',
        '2003-11-21', '2003-11-22', '2003-11-23',
        '2003-12-24', '2003-12-25', '2003-12-26',
        '2003-12-27', '2003-12-28');
```

As multiple IN-Lists are recited in the query, this query is processed by firstly combining the IN-List conditions on locn_tbl and on day_dt using a Cartesian product join (which is referenced to as "JR1" for convenience). The resulting table JR1 consists of a table where each row has two fields, namely day_dt and locn_nbr. The newly created table JR1 is then joined with daily_sales_tbl via the available index (locn_nbr, day_dt) using the join conditions:

JR1.day_dt=daily_sales_tbl.day_dt AND
    JR1.locn_nbr=daily_sales_tbl.locn_nbr

This produces a table of data which is equivalent to the result produced if the entire table were scanned.

The index utilized can be a primary index or a secondary index of the table. As shown in FIG. 4, a query rewritten with a join index may also pass through the process of access path planning (block 410). In other words, the In-List access path optimization method also applies to indexes defined on a join index including a primary index and a secondary index on the join index.

Utilizing indexes to reduce response time and system resources usage is one of the benefits which arise from substituting a join operation for a scan operation. Another benefit is reduced I/O (input from/output to disk). When the number of rows satisfying an IN-List condition is small relative to the total number rows in the table, fewer data blocks are read to produce the final result. The total benefit varies depending on the size of the predicate, the number of qualified rows and the index used, if applicable.

The CPU saving is potentially dramatic and non-intuitive. In a simple scan, the number of comparisons for each row can be very high. With prior art techniques, each predicate requires one comparison. Therefore, there is one comparison per row for each IN-List value. If there are multiple-column IN-Lists in the form of OR'ed compound conditions, called the disjuncted norm form (DNF), the number of comparison per row would be $N*(V^N)$. An example of a DNF is given below:

(x=1 AND y=3) OR (x=1 AND y=4) OR (x=2 AND y=3) OR (x=2 AND y=4)

An equivalent Conjuncted Norm Form (CNF) would be:

x in (1,2) AND y in (3,4)

The CNF requires (N*V) comparisons per row, where N is the number of IN-predicates and V is the number of values in each IN-predicate. In the case where there are 4 IN-Lists with 10 values and the table has 1 billion rows, the number of comparisons required when performing a scan would be 4*10*1 billion=40 billion for the CNF form and $4*(10^4)*1,000,000,000$=40,000 billion for the DNF form.

The IN-List access path, in contrast, replaces N single-column IN-Lists with N join predicates. Moreover, advanced join methods, such as merge join, nested join and single partition hash join, can take advantage of the already sorted index rows or can sort IN-List rows beforehand. This saves further CPU time to (potentially) N comparisons per row where N is the number of IN-Lists.

In other words, where an IN-List access path is applied to an indexed table, the number of rows compared will be proportional to the size of the IN-List Cartesian result, not the number of total rows in the table. In the example where there are 4 IN-Lists with 10 values, the number of rows compared will be 40,000, despite the table having 1 billion rows. This affords a substantial saving in total CPU cycles compared to a scan operation.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented method for optimizing a SQL query, in which the SQL query includes an IN-List to access data in a table, where the method includes
   evaluating, by a computer, whether access to the table can be performed as a join operation,
   transforming, by said computer, the IN-List to one or more relations that include one or more values of the IN-List, and
   joining, by said computer, the one or more relations with the table to access the data in the table.

2. The method of claim 1 further including transforming, by said computer, the IN-List by inserting the one or more values into a spool.

3. The method of claim 1 further including
evaluating, by said computer, the resource cost of a plurality of different IN-List access paths to implement the query,
comparing, by said computer, the cost of IN-List access paths and the cost of other access paths, and
selecting, by said computer, the least costly of the plurality of different access paths.

4. The method of claim 1 further including
evaluating, by said computer, the resource cost of a plurality of different join paths to implement the join between the one or more relations and the table, and
selecting, by said computer, the least costly of the plurality of different join paths.

5. The method of claim 1 further including
evaluating, by said computer, whether an index usable for the join between the one or more relations and the table exists, and if so
joining, by said computer, the one or more relations with the table through the index.

6. The method of claim 5 in which the index is the primary index of the table.

7. The method of claim 5 in which the index is a secondary index of the table.

8. The method of claim 5 in which the index is the primary index of a join index that at least partially covers the table.

9. The method of claim 5 in which the index is a secondary index of a join index that at least partially covers the table.

10. The method of claim 1 further including recognizing, by said computer, single column IN-Lists.

11. The method of claim 10 further including recognizing, by said computer, IN-predicate single column IN-Lists, and disjuncted single column conditions residing on the same column.

12. The method of claim 1, further including recognizing, by said computer, multiple-column IN-Lists.

13. The method of claim 12 further including
recognizing, by said computer, multiple single-column IN-Lists,
a list of disjuncted compound conditions residing in the same set of columns, and
the combination of one or more single column IN-Lists or multi-column IN-Lists.

14. A database system for accessing a database, the database system including
a parallel processing system including one or more nodes, and a plurality of CPUs, each of the one or more nodes providing access to one or more CPUs,
a plurality of virtual processes, each of the one or more CPUs providing access to one or more processes,
each process configured to manage data stored in one of a plurality of data-storage facilities,
an optimizer for optimizing a plan for executing a query to access data in a table, where the query includes an IN-List, the optimizer including
a process for evaluating whether access to the table can be performed as a join operation, and if so
transforming the IN-List to one or more relations that include one or more values of the IN-List, and
joining the one or more relations with the table to access the data in the table.

15. The database system of claim 14 where the optimizer further includes
transforming the IN-List by inserting the one or more values into a spool.

16. The database system of claim 14 where the optimizer further includes
a process for evaluating the resource cost of a plurality of different IN-List access paths to implement the query,
comparing the cost of IN-List access paths and the cost of other access paths, and
selecting the least costly of the plurality of different access paths.

17. The database system of claim 14 where the optimizer further includes
a process for evaluating the cost of a plurality of different join paths to implement the join between the one or more relations and the table, and
selecting the least costly of the plurality of different join paths.

18. The database system of claim 14 where the optimizer further includes
a process for evaluating whether an index usable for the join between the one or more relations and the table exists for the table, and if so
joining the one or more relations with the table through the index.

19. The database system of claim 18 in which the index is the primary index of the table.

20. The database system of claim 18 in which the index is a secondary index of the table.

21. The database system of claim 18 in which the index is the primary index of a join index that at least partially covers the table.

22. The database system of claim 18 in which the index is a secondary index of a join index that at least partially covers the table.

23. The database system of claim 14 where the optimizer further includes a process for recognizing IN-predicate single column IN-Lists, and disjuncted single column conditions residing in the same column.

24. The database system of claim 14 where the optimizer further includes a process for recognizing multiple-column IN-Lists.

25. The database system of claim 24 where the optimizer further includes
a process for recognizing each one of multiple single-column IN-Lists,
a list of disjuncted compound conditions residing in the same set of columns, and
the combination of one or more single column IN-Lists or multi-column IN-Lists.

26. A computer program, stored on a tangible storage medium, for use in optimizing a query plan for executing a query to access data in a table where the query includes an IN-List, including instructions which cause a computer to
evaluate whether access to the table can be performed as a join operation, and if so transform the IN-List to one or more relations that include one or more values of the IN-List, and
join the one or more relations with the table to access the data in the table.

27. The computer program of claim 26 further including executable instructions which cause a computer to
transform the IN-List by inserting the one or more values into a spool.

28. The computer program of claim 26 further including executable instructions which cause a computer to
evaluate the resource path of a plurality of different access paths to implement the query, and select the least costly of the plurality of different access paths.

29. The computer program of claim 26 further including executable instructions that cause a computer to
evaluate the resource cost of a plurality of different join paths to implement the join between the one or more relations and the table, and
select the least costly of the plurality of different join paths.

30. The computer program of claim 26 further including executable instructions that cause a computer to
evaluate whether an index exists for the table, and if so
join the one or more relations with the table to access the data in the table.

31. The computer program of claim 26 in which the index is the primary index of the table.

32. The computer program of claim 26 in which the index is a secondary index of the table.

33. The computer program of claim 26 in which the index is the primary index of a join index that at least partially covers the table.

34. The computer program of claim 26 in which the index is a secondary index of a join index that at least partially covers the table.

35. The computer program of claim 26 further including executable instructions that cause a computer to
recognize each one of IN-predicate single column IN-Lists, and disjuncted single column conditions residing in the same column.

36. The computer program of claim 26 further including executable instructions that cause a computer to recognize multi-column IN-Lists.

37. The computer program of claim 36, further including executable instructors that cause a computer to
recognize each one of a multiple single-column IN-Lists,
a list of disjuncted compound conditions residing in the same set of columns, and
the combination of one or more single column IN-Lists or multi-column IN-Lists.

* * * * *

UNITED STATES PATENT AND TRADEMARK OFFICE
CERTIFICATE OF CORRECTION

| | | |
|---|---|---|
| PATENT NO. | : 7,882,101 B2 | Page 1 of 1 |
| APPLICATION NO. | : 11/535632 | |
| DATED | : February 1, 2011 | |
| INVENTOR(S) | : Grace Au et al. | |

It is certified that error appears in the above-identified patent and that said Letters Patent is hereby corrected as shown below:

On the Title Page, Item (54) and Col. 1, lines 1-2

Title needs to read

OPTIMIZING ACCESS TO A DATABASE USING IN LIST QUERIES

Not:

OPTIMIZING SEARCH TREES BY INCREASING SUCCESS SIZE PARAMETER

Signed and Sealed this
Twenty-sixth Day of April, 2011

David J. Kappos
*Director of the United States Patent and Trademark Office*